United States Patent
Clouteir et al.

(10) Patent No.: US 9,295,273 B1
(45) Date of Patent: *Mar. 29, 2016

(54) POPCORN POPPER

(71) Applicant: Pop And Roast. Inc., Blaine, WA (US)

(72) Inventors: Andre Dean Clouteir, Blaine, WA (US); Debra Lynne Sasken-Duff, Blaine, WA (US); Adriana Collins, Blaine, WA (US)

(73) Assignee: Pop And Roast, Inc., Blaine, WA (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/888,225

(22) Filed: May 6, 2013

Related U.S. Application Data (63) Continuation of application No. 12/969,230, filed on Dec. 15, 2010, now Pat. No. 8,434,403.

(51) Int. Cl.
  *A23L 1/18*   (2006.01)
(52) U.S. Cl.
  CPC ..................... *A23L 1/1807* (2013.01)
(58) Field of Classification Search
  None
  See application file for complete search history.

(56) References Cited

U.S. PATENT DOCUMENTS

| | | |
|---|---|---|
| 110,916 A | 1/1871 | Houcke |
| 912,136 A | 2/1909 | Landry |
| 1,032,212 A | 7/1912 | Hilton |
| 1,344,836 A | 6/1920 | Walden |
| 1,444,244 A | 2/1923 | Grossenbacher |
| 1,517,624 A | 12/1924 | Girard |
| 1,620,765 A | 3/1927 | Jackson |
| 2,441,941 A | 5/1948 | Shafter |
| 2,505,966 A | 5/1950 | Humphrey |
| 2,505,967 A | 5/1950 | Humphrey |
| 2,561,203 A | 7/1951 | Morris |
| 4,202,256 A | 5/1980 | Brooks |
| 4,763,567 A | 8/1988 | Dalquist, III et al. |
| 5,163,357 A | 11/1992 | Felknor et al. |
| 6,254,268 B1 | 7/2001 | Long |
| 7,744,026 B2 | 6/2010 | Gregory et al. |

*Primary Examiner* — David Angwin
*Assistant Examiner* — Renee L Miller
(74) *Attorney, Agent, or Firm* — Dwayne E. Rogge; Schacht Law Office, Inc.

(57) ABSTRACT

This disclosure relates to the field of stovetop popcorn poppers. In one form, the popcorn popper comprises an interoperating apparatus to facilitate the mixing or stirring of the popped popcorn during a coating or flavoring operation.

13 Claims, 8 Drawing Sheets

POPCORN POPPER

RELATED APPLICATIONS

This application is a Continuation of U.S. Ser. No. 12/969,230 filed Dec. 15, 2010 incorporated here by reference.

BACKGROUND OF THE DISCLOSURE

Field of the Disclosure

This disclosure relates to the field of stovetop popcorn poppers, with an interoperating apparatus to facilitate the mixing or stirring of the popped popcorn during a coating or flavoring operation.

SUMMARY OF THE DISCLOSURE

Disclosed herein is a food preparation device comprising a pot having a substantially planar and circular bottom, a substantially vertical annular sidewall having one edge in continuous contact with the bottom, an annular rim in continuous contact with the sidewall, vertically opposed to the bottom, and a handle projecting from the annular sidewall. A lid is also provided, the lid comprising upper and lower faces, wherein the lid is removably in contact with the annular rim of the pot. In one form, the lid further comprises at least one steam vent and may be transparent to allow the user to view the prepared product. Glass or other transparent or translucent materials can be used. The lid may also include a removable cap, which is snap fit into a surface defining a void through the lid. This removable cap may be concave and perforated to provide a distribution location for butter, caramel, or similar food products.

An agitator portion is also provided comprising a shaft extending through the center of the lid, substantially perpendicular to the faces of the lid.

A rotating handle is attached to the shaft, wherein the rotating handle is configured to be rotated by a user to rotate the shaft. A bearing member is centered about the shaft and in contact with the lid. The handle comprises at least one blunt edged lower paddle coupled to the shaft at an angle thereto.

There is a vertical clearance gap between the lower paddle and the bottom of the pot to prevent jamming of the mechanism. At least one upper paddle is also provided, extending into the pot and fixed not to rotate with the shaft. A vertical clearance gap is provided between the upper paddle and the lower paddle. In one form, this clearance gap between the paddles is at least 20 mm wide.

While different embodiments are conceived, the food preparation device as disclosed above may be arranged with two lower paddles linearly aligned with each other and extending perpendicular to vertical axis of the shaft.

The food preparation device as disclosed above may be arranged wherein at least one lower paddle comprises a planar portion, which is at an angle of substantially 45° from the plane of the bottom of the pot. In this arrangement, the product is rotated and lifted away from the bottom of the pot simultaneously. In one form, at least one lower paddle is removably attached to the shaft.

DESCRIPTION OF THE PREFERRED EMBODIMENTS

While many prior devices have been formulated for the popping of popcorn using the method of hot oil on a stovetop, such as can be found in U.S. Pat. Nos. 4,763,567 and 5,163,357, it appears that the demand for flavored or otherwise coated popcorn has increased, and thus, a home-use device for the coating of popcorn is much desired. Looking to FIG. 1, a food preparation device 20 is shown comprising three distinct portions, these portions being a pot or vessel 22, a lid 24, and an agitator portion 26. Each of these portions will be described in detail herein. To aid in describing the apparatus, an axis system 10 will be utilized herein generally comprising a vertical axis 12, a radial axis 14 extending radially outwards from the vertical axis of the pot 22, and a rotational axis 16. These axes are utilized herein to describe particular arrangements of each element to other elements and are not intended to be limiting to the overall apparatus or claims, except as particularly pointed out in the claims. The term "cooking" used herein is intended to refer to the art or practice of preparing food. The term is not intended to be limited to the heating of food. While the apparatus herein is easily used on a standard kitchen stovetop, it may also be used on a hotplate, over a fire, or in combination with a heating element. This disclosure will use the term stovetop relatively broadly.

The pot 22 generally comprises a substantially planar and circular bottom 28, having an outer edge 30, which attaches an annular sidewall 32 to the bottom 28. One example of a handle 34 is shown, comprising an attachment portion 36, which couples the handle 34 to the annular sidewall 32. The handle 34 could alternatively be coupled to the lid 24, bottom 28, or any other fixed portion of the food preparation device 20. The upper edge of the annular sidewall 32 terminates in an annular rim 38. Similar pots are well-known in the art of cooking, and the features shown in the accompany FIGS. could be altered to conform to a user's particular needs.

The lid 24, in one form, has an outer edge that is substantially the same size as the annular rim 38 of the pot 22 and is operably configured to interact therewith, in one embodiment, to form a seal. As a great deal of water vapor in the form of steam is produced by the popping of popcorn, it may not be desired to have an airtight or watertight seal between the lid 24 and the rim 38. In addition, steam vents that direct steam up through the lid 24, away from the handle 34, and away from the rotating handle 50 may be provided, but are not shown in the FIGS. as they are easily constructed by one of ordinary skill in the art. Once again, silicone rubber has been shown to provide an excellent material for such a vent. In one form, the lid 24 comprises a surface defining a void 39, which is configured to receive a removable cap 40, which may further comprise surfaces defining perforations 42. In one form, the removable cap 40 is cup shaped or concave, so that butter, caramel or similar flavorings or colorings can be added thereto, slowly flowing through the perforations 42 and coating the food articles being processed. In one form, the removable cap 40 is made of silicone rubber, which is not negatively affected by heat. The lid 24 also comprises a surface defining a void 44 into which is attached a bearing member 46, which provides frictional relief between the lid 24 and a shaft 48 of the agitator portion 26. As the process of popping and coating popcorn is visually and audibly interesting, it may be desired to use a transparent lid, such as one made substantially of glass, which may be tempered, so as to view the process. Such a transparent lid would also function to allow the person using the apparatus to visually observe the condition of the popcorn during the popping and coating processes.

Figure 1:
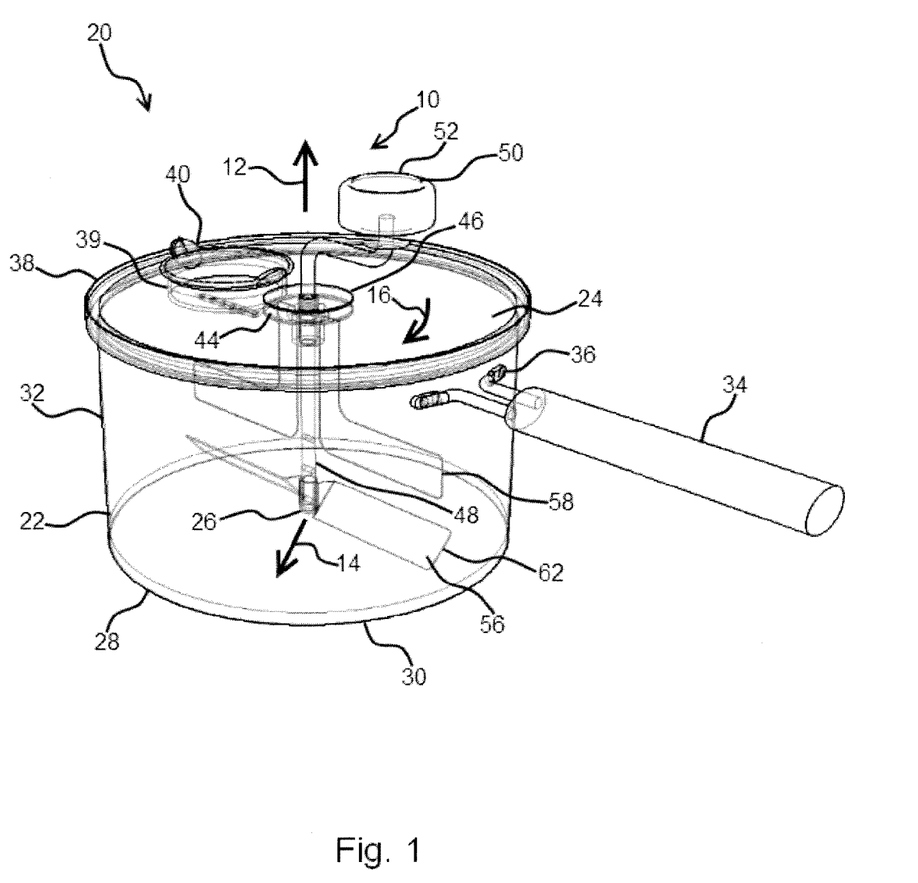
FIG. 1 is an isometric, wireframe view of one embodiment of the disclosure.
Figure 2:
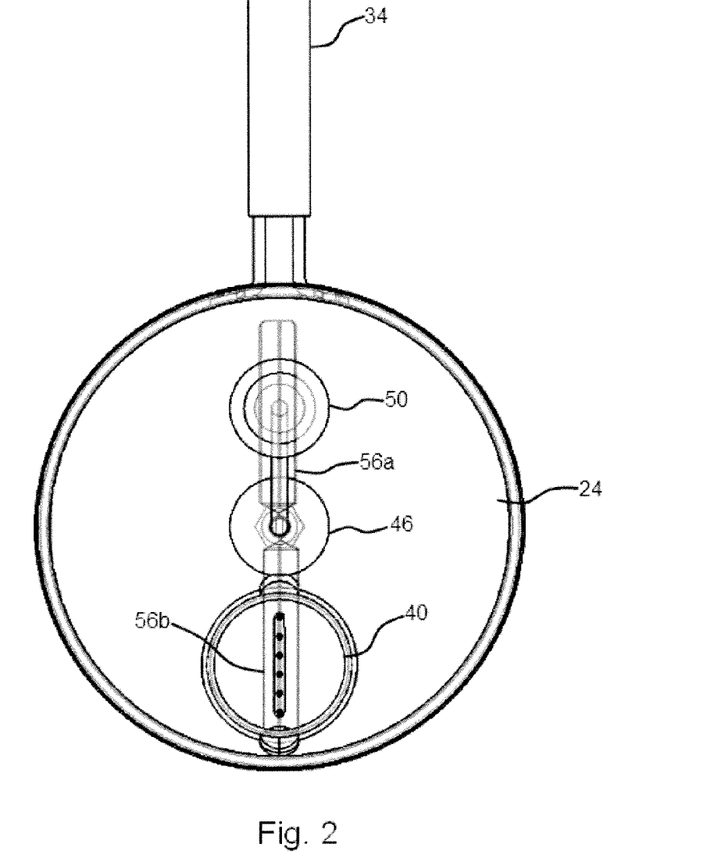
FIG. 2 is a top view of the embodiment shown in FIG. 1.
Figure 3:
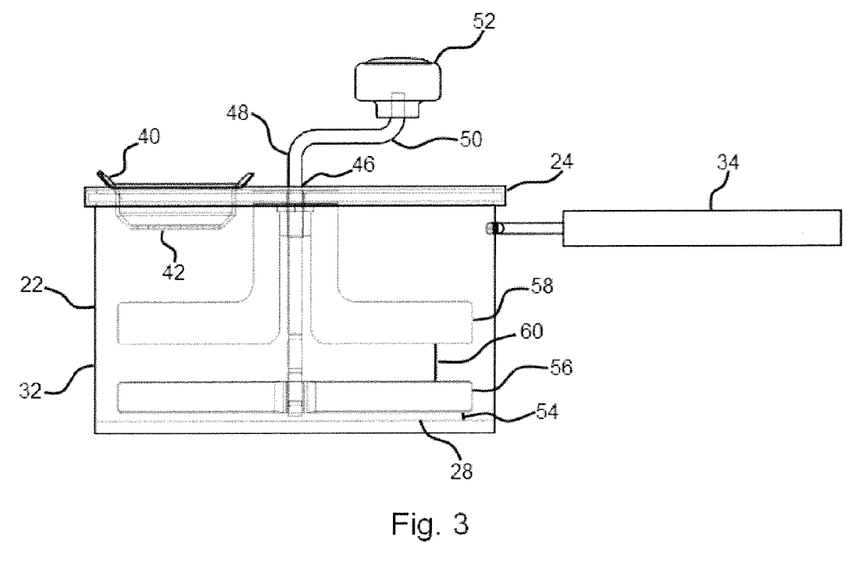
FIG. 3 is a right side view of the embodiment shown in FIG. 1.
Figure 4:
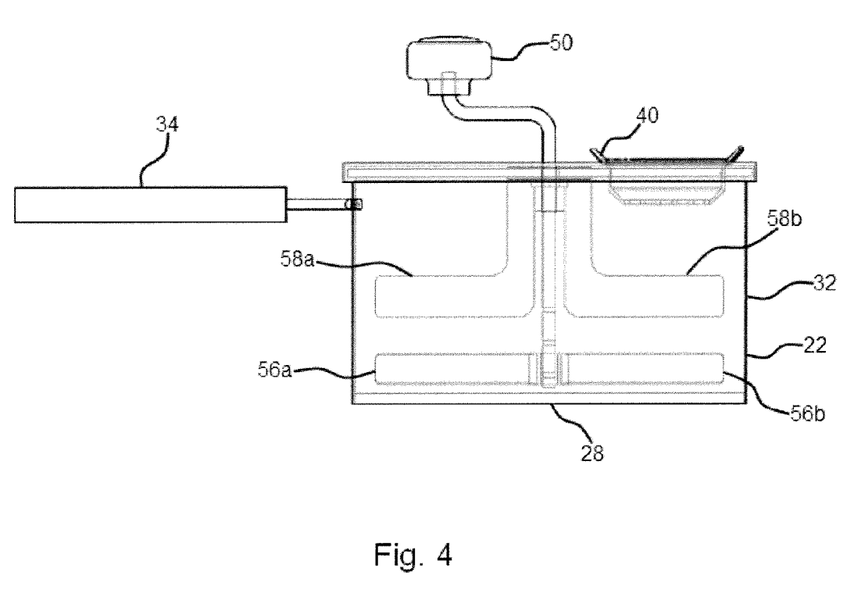
FIG. 4 is a left side view of the embodiment shown in FIG. 1.
Figure 5:
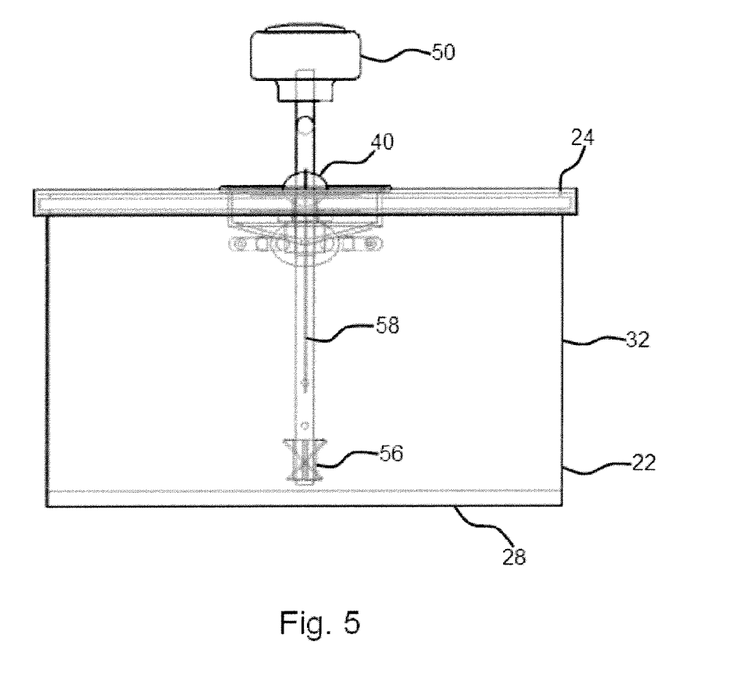
FIG. 5 is a front view of the embodiment shown in FIG. 1.
Figure 6:
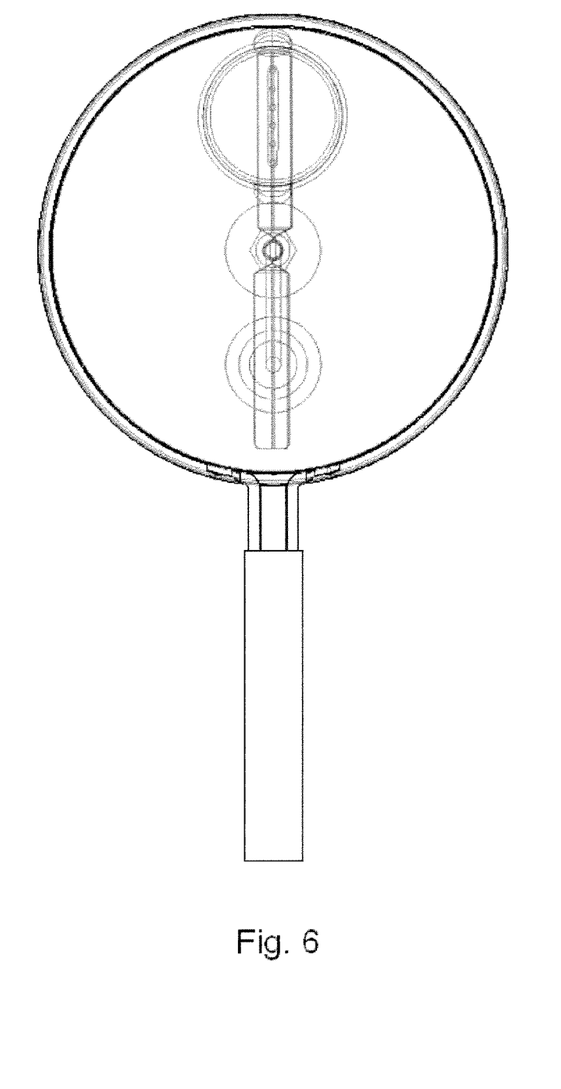
FIG. 6 is a bottom view of the embodiment shown in FIG. 1.
Figure 7:
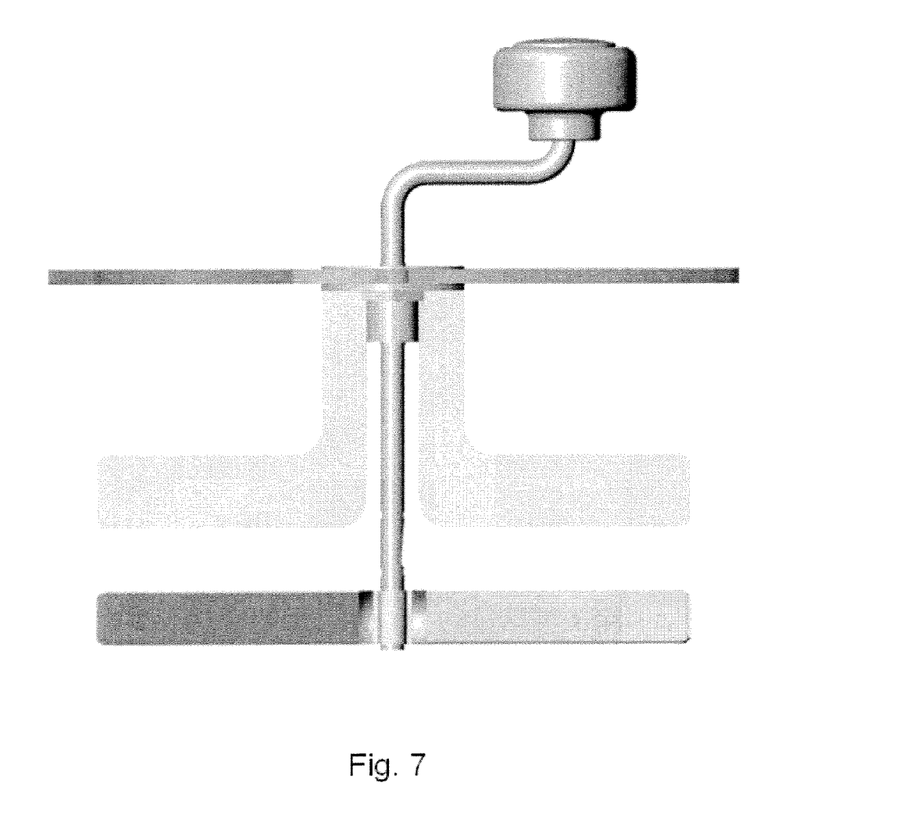
FIG. 7 is a side view of the internal components of the device shown in FIG. 1.
Figure 8:
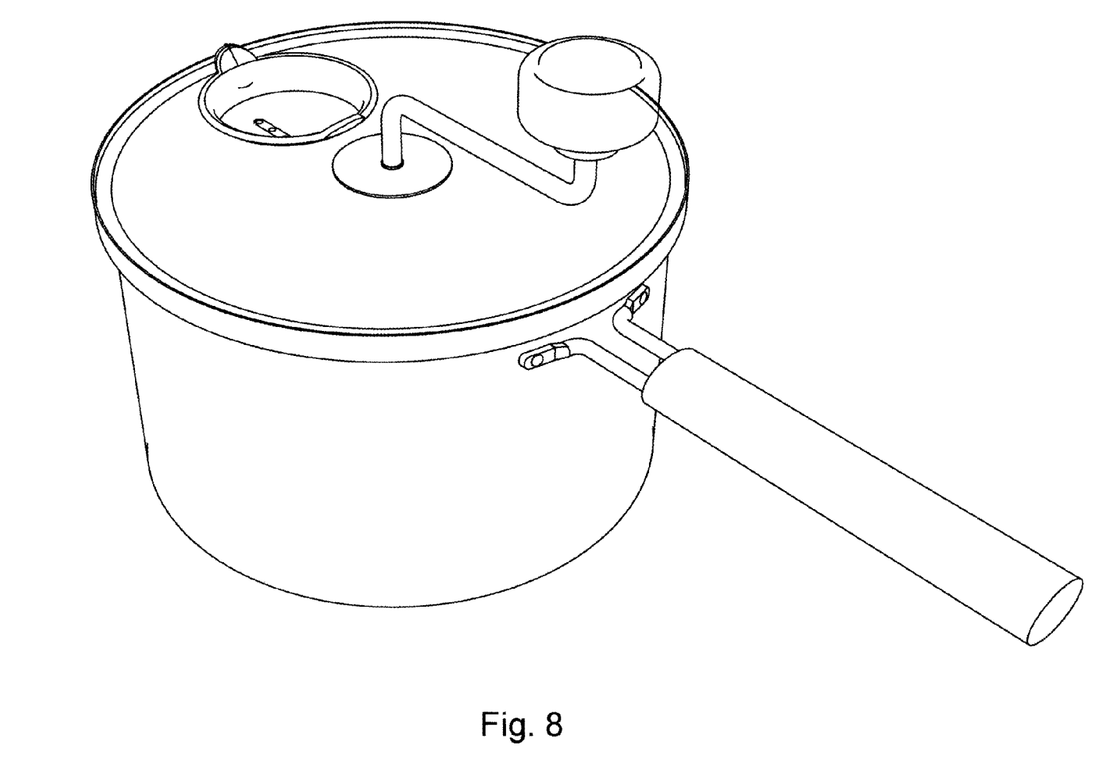
FIG. 8 is an isometric view of one embodiment of the disclosure.

The agitator portion 26 comprises the shaft 48 and rotating handle of 50, which may further comprise a knob 52 pivotably attached to an extension of the shaft 48 to increase the comfort of the user during operation. One lower paddle 56 is attached to the lowermost portion of the shaft 48 and configured to rotate therewith. While the plurality of lower paddles 56 are shown in FIG. 1 in linear opposition through the axis 12 of the shaft 48, a single lower paddle 56 may also be used, or paddles which are not in linear opposition. Looking to FIG. 3, it can be seen that there is a gap 54 between the lower paddle 56 and the interior surface of the substantially flat bottom 28 of the pot 22.

While an embodiment utilizing only the portions disclosed to this point would function adequately in some instances, it has been found that the apparatus functions better in other applications with the addition of at least one fixed upper paddle 58. There should generally be a clearance gap 60 between the upper paddle 58 and the lower paddle 56. While the upper paddle 58 is shown as generally L-shaped and attached to the lid 24 adjacent the bearing member 46, other shapes may work adequately well and may alternatively be attached to the inner portion of the sidewall 32 of the pot 22, or perhaps even the bottom 28 of the pot 22. In one form, the upper paddle is riveted or otherwise affixed to the lid to provide a fixed, rigid connection thereto.

In operation, when popping popcorn for example, a user would add a volume of a fluid, such as olive oil, into the pot 22, place the apparatus on top of a heat source, such as a stovetop, and add a volume of popcorn to the oil. In one operation, it may be desired to add the lid 24 and agitator portion 26 to the pot 22 after the oil and popcorn have been added. The user would shake the food preparation device 20 by way of the handle 34 to ensure that the popcorn kernels did not burn. Such a popping method is very well known in the art of popping popcorn and preparing other foods. Once the popcorn is completely popped, butter or a similar fluid may be added to the removable cap 40, which would heat and drip through the perforations 42. During this portion, a user would rotate the rotating handle 50, which would in turn rotate the lower paddles 56, agitating the popcorn therein. As the lower paddles 56, in one form, comprise a lifting angle 62 relative to the bottom 28 of the pot, the popcorn is lifted away from the bottom 28 and simultaneously stirred rotationally along the rotational axis 16. Tests have found that without the upper paddles 58, the entire body of popcorn tends to rotate as a unitary body; however, with the addition of the upper paddles 58, more agitation occurs between individual popcorn elements. If the substance to be introduced to the popped popcorn is not of the proper form to be added to the removable cap 40 or will not properly disperse through the perforations 42, the removable cap 40 may be completely removed. This may be desired if powdered cheese, caramel, ketchup, or other colorings or flavorings are to be introduced.

In another operation, the food preparation device can be utilized for foods other than popcorn, such as nuts. The nuts may be preheated prior to introducing them to the pot 22 or may be heated within the pot 22. At any rate, the colorant or flavoring would be introduced through the removable cap 40 or, alternatively, through the surface defining a void 40 in the lid 24 after the cap 40 has been temporarily removed. Then, the rotating handle 50 is operated to properly agitate the nuts or other foodstuffs therein during the coating operation.

While it is generally easy to clean the apparatus by simply removing the lid 24 and placing the entire combination of the lid 24 and agitator portion 26 within a cleaning device, such as a dishwasher, it may also be desired to have the lower paddles 56 removably attached to the shaft 48 to allow for removal of the lower paddles 56, shaft 48, bearing member 46, and fixed upper paddles 58 individually for separate cleaning.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A popcorn popper comprising;
   a pot comprising:
      a thermally conductive bottom;
      an annular sidewall having one edge in continuous contact with the bottom;
      an annular rim in continuous contact with the sidewall, vertically opposed to the bottom;
   a lid comprising;
      upper and lower faces;
      wherein the lid is removably in contact with the annular rim of the pot;
   an agitator portion comprising;
      a shaft extending through the center of the lid, substantially perpendicular to the faces of the lid;
      the shaft having an axis of rotation;
      a handle attached to the shaft, wherein the handle is configured to rotate the shaft;
      at least one blunt edged lower paddle coupled to the shaft at an angle thereto;
      wherein there is a vertical clearance gap between the lower paddle and the bottom of the pot;
   at least one upper paddle extending into the pot and fixed not to rotate with the shaft;
   a vertical clearance gap between the upper paddle and the lower paddle; and
   wherein each lower paddle rotates in a plane vertically and directly below the upper paddle.

2. The popcorn popper as recited in claim 1 wherein each of the lower paddles have a lower portion extending perpendicular to the vertical axis of rotation of the shaft.

3. The popcorn popper as recited in claim 1 wherein each of the upper paddles are substantially L-shaped.

4. The popcorn popper as recited in claim 1 wherein each of the upper paddles are fixedly attached to the lid.

5. The popcorn popper as recited in claim 1 comprising a clearance gap greater than 20 mm between each upper paddle and each lower paddle.

6. The popcorn popper as recited in claim 1 wherein the at least one lower paddle comprises a planar portion which is at an angle of substantially 45° from the plane of the bottom of the pot.

7. The popcorn popper as recited in claim 1 wherein the at least one lower paddle is removably attached to the shaft.

8. The popcorn popper as recited in claim 7 wherein each and every lower paddle is removably attached to the shaft.

9. The popcorn popper as recited in claim 1 wherein the lid further comprises at least one steam vent.

10. The popcorn popper as recited in claim 1 wherein the lid is transparent.

11. The popcorn popper as recited in claim 10 wherein the lid is comprised of glass.

12. The popcorn popper as recited in claim 1 wherein the lid further comprises a removable cap which is snap fit into a surface defining a void through the lid.

13. The popcorn popper as recited in claim 12 wherein the removable cap is perforated.

\* \* \* \* \*